(12) United States Patent
Liu et al.

(10) Patent No.: US 12,521,096 B2
(45) Date of Patent: Jan. 13, 2026

(54) MEASURING METHOD FOR PERISTALSIS INFORMATION BASED ON ULTRASONIC SCANNING, MEASURING APPARATUS THEREOF AND MEDIUM

(71) Applicant: SHENZHEN MINDRAY BIO-MEDICAL ELECTRONICS CO., LTD., Guangdong (CN)

(72) Inventors: Mengfei Liu, Shenzhen (CN); Shuangshuang Li, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 252 days.

(21) Appl. No.: 18/201,575

(22) Filed: May 24, 2023

(65) Prior Publication Data

US 2023/0404534 A1    Dec. 21, 2023

(30) Foreign Application Priority Data

May 27, 2022    (CN) .......................... 202210592541.2

(51) Int. Cl.
*A61B 8/00*    (2006.01)

(52) U.S. Cl.
CPC .......... *A61B 8/485* (2013.01); *A61B 8/5207* (2013.01)

(58) Field of Classification Search
CPC ..... A61B 8/485; A61B 8/5207; A61B 8/5223; A61B 8/08
See application file for complete search history.

(56) References Cited

U.S. PATENT DOCUMENTS 6,030,344 A * 2/2000 Guracar ............... G01S 15/895
600/458

FOREIGN PATENT DOCUMENTS

WO    WO-2021087765 A1 *    5/2021 ............... A61B 8/08

OTHER PUBLICATIONS

Li—WO2021/087765—Machine Translation (Year: 2021).*

* cited by examiner

*Primary Examiner* — Peter Luong
(74) *Attorney, Agent, or Firm* — Sheppard Mullin Richter & Hampton LLP

(57) ABSTRACT

A measuring method for peristalsis information based on ultrasonic scanning, includes: obtaining a second ultrasonic echo signal by performing a second ultrasonic scan on a field of view comprising a junction band, the second ultrasonic scan being different from a first ultrasonic scan as a conventional scan mode; recognizing a portion of interest of the junction band and determining motion information about the portion of interest of the junction band according to the second ultrasonic echo signal or a second ultrasonic image generated therefrom; and determining peristalsis information about the portion of interest of the junction band according to the motion information about the portion of interest of the junction band.

20 Claims, 9 Drawing Sheets

--- obtaining a second ultrasonic echo signal by performing a second ultrasonic scan on a field of view comprising a junction band, the second ultrasonic scan being different from a first ultrasonic scan as a conventional scan mode — 301 according to the second ultrasonic echo signal or a second ultrasonic image generated therefrom, recognizing a portion of interest of the junction band and determining motion information about the portion of interest of the junction band — 302 determining peristalsis information about the portion of interest of the junction band according to the motion information about the portion of interest of the junction band — 303

MEASURING METHOD FOR PERISTALSIS INFORMATION BASED ON ULTRASONIC SCANNING, MEASURING APPARATUS THEREOF AND MEDIUM

CROSS-REFERENCE TO RELATED APPLICATIONS

This application is based on and claims priority to and benefits of Chinese Patent Application No. 202210592541.2, filed on May 27, 2022. The entire content of the above-referenced application is incorporated herein by reference.

TECHNICAL FIELD

The present disclosure relates to measurement of motion information based on ultrasonic scanning and, more specifically, to measuring methods for peristalsis information based on ultrasonic scanning, measuring apparatus thereof and media.

BACKGROUND

Endometrial receptivity refers to the ability of the endometrium to accept a fertilized egg in a state where the blastocyst is allowed to locate, adhere, invade and cause changes in the endometrium stroma resulting in embryo implantation. The correct evaluation of endometrial receptivity has important clinical significance in the selection of implantation time and the evaluation of pregnancy rate, which is an important part in a reproductive evaluation standard system at present. Peristaltic waves of the endometrium are one of the important indicators to evaluate endometrial receptivity, and the frequency, direction and intensity thereof change with menstrual cycle, thus assisting sperm transport and embryo implantation. At the same time, uterine diseases will affect the peristaltic waves of the endometrium, so the study of peristaltic waves also has potential value in assisting the diagnosis of uterine diseases.

Studies have shown that peristaltic waves of the endometrium often contain irregular oscillations of the endometrium that are not clearly associated with endometrial receptivity and/or uterine disease, and that only the peristaltic waves of the endometrium may miss useful information related to endometrial receptivity and/or uterine disease. There has been no quantitative study on peristaltic waves in other uterine parts than the endometrium.

SUMMARY

Therefore, there is a need for a measuring method for peristalsis information based on ultrasonic scanning, a measuring apparatus thereof and a medium that can quantitatively analyze the source of peristaltic waves of a endometrium—the peristaltic waves of a junction band, which has a higher regularity of the peristalsis information due to peristaltic waves generated by regular contraction of muscle cells in the junction band and is less affected by irregular peristalsis such as the endometrium itself, providing a more effective reference for such conditions as endometrial receptivity and/or uterine diseases.

In accordance with a first aspect of the present disclosure, a measuring method for peristalsis information based on ultrasonic scanning is provided. The measuring method may include the following steps. A first ultrasonic echo signal may be obtained by performing a first ultrasonic scan on a field of view including a junction band. A portion of interest of the junction band may be recognized based on the first ultrasonic echo signal or a first ultrasonic image generated therefrom. A second ultrasonic echo signal may be obtained by performing a second ultrasonic scan on the portion of interest of the junction band. Motion information about the portion of interest of the junction band based on the second ultrasonic echo signal or a second ultrasonic image generated therefrom. Peristalsis information about the portion of interest of the junction band may be determined according to the motion information about the portion of interest of the junction band.

In accordance with a second aspect of the present disclosure, a measuring method for peristalsis information based on ultrasonic scanning is provided. The measuring method may include the following steps. A first ultrasonic echo signal may be obtained by performing a first ultrasonic scan on a field of view including a junction band. The portion of interest of the junction band may be recognized based on the first ultrasonic echo signal or a first ultrasonic image generated therefrom. Peristalsis information about the portion of interest of the junction band may be determined based on the ultrasonic echo signal or the first ultrasonic image.

In accordance with a third aspect of the present disclosure, a measuring apparatus for peristalsis information based on ultrasonic scanning is provided. The measuring apparatus may include an ultrasonic probe, a transmitting and receiving control circuit and at least one processor. The ultrasonic probe may be configured to transmit ultrasonic waves to a field of view comprising a junction band and receive corresponding ultrasonic echoes to obtain an ultrasonic echo signal. The transmitting and receiving control circuit may be configured to output a transmitting and receiving sequence to the ultrasonic probe to control the ultrasonic probe to transmit the ultrasonic waves and receive the ultrasonic echoes. The at least one processor may be configured to: control the transmission and reception of the ultrasonic probe by the transmitting and receiving control circuit to perform a first ultrasonic scan on the field of view comprising a junction band to obtain a first ultrasonic echo signal or to perform a second ultrasonic scan on the portion of interest of the junction band to obtain a second ultrasonic echo signal; and perform the measuring method for peristalsis information based on ultrasonic scanning according to the embodiments of the present disclosure.

The measuring method may include the following steps. A first ultrasonic echo signal may be obtained by performing a first ultrasonic scan on a field of view including a junction band. A portion of interest of the junction band may be recognized based on the first ultrasonic echo signal or a first ultrasonic image generated therefrom. A second ultrasonic echo signal may be obtained by performing a second ultrasonic scan on the portion of interest of the junction band. Motion information about the portion of interest of the junction band based on the second ultrasonic echo signal or a second ultrasonic image generated therefrom. Peristalsis information about the portion of interest of the junction band may be determined according to the motion information about the portion of interest of the junction band.

In accordance with a fourth aspect of the present disclosure, a measuring apparatus for peristalsis information based on ultrasonic scanning is provided. The measuring apparatus may include an ultrasonic probe, a transmitting and receiving control circuit and at least one processor. The ultrasonic probe may be configured to transmit ultrasonic waves to a field of view comprising a junction band and receive corresponding ultrasonic echoes to obtain an ultrasonic echo signal. The transmitting and receiving control circuit may be configured to output a transmitting and receiving sequence to the ultrasonic probe to control the ultrasonic probe to transmit the ultrasonic waves and receive the ultrasonic echoes. The at least one processor may be configured to: control the transmission and reception of the ultrasonic probe by the transmitting and receiving control circuit to perform a first ultrasonic scan on the field of view comprising a junction band to obtain a first ultrasonic echo signal; and perform the measuring method for peristalsis information based on ultrasonic scanning according to the embodiments of the present disclosure. The measuring method may include the following steps. A first ultrasonic echo signal may be obtained by performing a first ultrasonic scan on a field of view including a junction band. A portion of interest of the junction band may be recognized based on the first ultrasonic echo signal or a first ultrasonic image generated therefrom. Peristalsis information about the portion of interest of the junction band may be determined according to the first ultrasonic echo signal or the first ultrasonic image.

In accordance with a fifth aspect of the present disclosure, provided is a computer-readable memory comprising stored thereon computer-readable instructions that capable of being executed by a processor to implement the measuring method for peristalsis information based on ultrasonic scanning according to the embodiments of the present disclosure.

By means of the measuring method for peristalsis information based on ultrasonic scanning, the measuring apparatus thereof and a medium according to the embodiments of the present disclosure, the source of peristaltic waves of the endometrium—the peristaltic waves of a junction band can be quantitatively analyzed. The regular contraction of muscle cells in the junction band produces peristaltic waves, resulting in a higher regularity of the peristalsis information and less affect by irregular peristalsis such as the endometrium itself, thereby providing a more effective reference for such conditions as endometrial receptivity and/or uterine diseases.

BRIEF DESCRIPTION OF THE DRAWINGS

In the accompanying drawings, which are not necessarily drawn to scale, like reference numerals may depict similar components in different views. The same reference numerals with a letter suffix or a different letter suffix may denote different examples of similar components. The drawings illustrate various embodiments largely by way of examples rather than restrictions and together with the description and claims serve to explain the disclosed embodiments. Where appropriate, the same reference numbers will be used throughout the drawings to refer to the same or like parts. Such embodiments are illustrative, and are not intended to be exhaustive or exclusive of the present apparatus or method.

DETAILED DESCRIPTION

Hereinafter, embodiments of the present disclosure will be described; however, the present disclosure is not intended to be limited to the embodiments. And all components of the embodiments are not always essential.

As used herein, the terms "first", "second", and the like do not denote any order, quantity, or importance, but rather are used to distinguish parts. The word "comprising", "including" and the like means that the element preceding the word covers the element listed after the word, without precluding the possibility of covering other elements as well. "Up", "down", "left", "right", etc., are only used to indicate a relative positional relationship, which may change accordingly when the absolute position of the object being described changes.

All terms (including technical or scientific terms) used herein have the same meaning as commonly understood by a person skilled in the art to which this disclosure belongs, unless otherwise specifically defined. It should also be understood that terms, such as those defined in commonly used dictionaries, should be interpreted as having a meaning that is consistent with their meaning in the context of the relevant art and should not be interpreted in an idealized or overly formal sense unless expressly so defined herein. Techniques, methods and equipment known to those skilled in the relevant art may not be discussed in detail, but such techniques, methods, and devices should be considered as part of the specification where appropriate.

Figure 1:
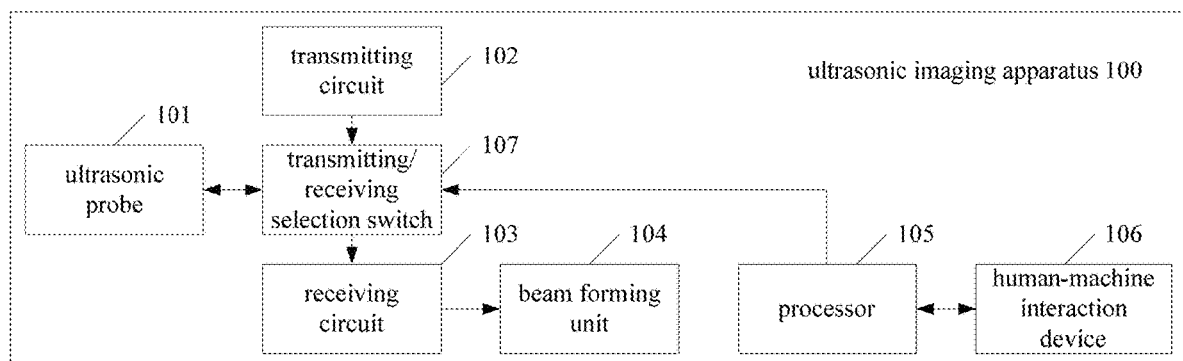
FIG. 1 is a schematically structural diagram of an exemplary ultrasonic imaging apparatus that can be used to implement the measuring method for peristalsis information based on ultrasonic scanning according to the present disclosure.

FIG. 1 schematically shows the structure of an exemplary ultrasonic imaging apparatus 100 capable of being used to implement a measuring method for peristalsis information about a junction band based on ultrasonic scanning according to the present disclosure. As shown in FIG. 1, the ultrasonic imaging apparatus 100 includes an ultrasonic probe 101, a transmitting circuit 102, a receiving circuit 103, a beam forming unit 104, a processor 105 and a human-machine interaction device 106. The transmitting circuit 102 and the receiving circuit 103 may be connected to the ultrasonic probe 101 via a transmitting/receiving selection switch 107. The following is an example of taking the transmitting circuit 102, the receiving circuit 103 and the transmitting/receiving selection switch 107 as a transmitting and receiving control circuit; but it should be noted that the transmitting and receiving control circuit may also be implemented in other ways provided that it is configured to output a transmitting and receiving sequence to the ultrasonic probe so as to control the ultrasonic probe to transmit ultrasonic waves and receive ultrasonic echoes.

During ultrasonic imaging, the transmitting circuit 102 may send a transmitting sequence with a certain amplitude and polarity after delayed focusing to the ultrasonic probe 101 via the transmitting/receiving selection switch 107 so as to excite the ultrasonic probe 101 to transmit ultrasonic beams to a target tissue (such as, but not limited to, the field of view including the junction band, like uterine part, local uterus, etc.). Note that the so-called "field of view including the junction band" may include an entire junction band or part of the junction band.

After a certain delay, the receiving circuit 103 may receive echoes of the ultrasonic beams via the transmitting/receiving selection switch 107 to obtain an ultrasonic echo signal which is sent to the beam forming unit 104. The beam forming unit 104 may process the ultrasonic echo signal, including but not limited to focusing delay, weighting and channel summing, to obtain a beam-formed ultrasonic echo signal. The beam-formed ultrasonic echo signal may then be sent to the processor 105 for processing such as orthogonal demodulation, echo signal intensity calculation and logarithmic compression to obtain a required ultrasonic image or a video file composed of ultrasonic images.

The processor 105 herein may process the ultrasonic echo signal that is at any step after beam forming processing or the ultrasonic image generated based on the ultrasonic echo signal, so as to obtain the peristalsis information about the portion of interest of the junction band. In the following embodiments, the processing of ultrasonic image data by the processor 105 is mainly described as an example; and it should be appreciated that the processor may also process ultrasonic echo signals with at least amplitude information that are at any step after beam forming. For example, the processor may perform the same processing on beam-formed ultrasonic echo signals (raw ultrasonic echo signals), orthogonal-demodulated ultrasonic echo signals, echo-signal-intensity-calculated ultrasonic echo signals, or logarithmically compressed ultrasonic echo signals. The peristalsis information about the portion of interest of the junction band may thereby be obtained. The ultrasonic image generated by the ultrasonic echo signals may be generated (obtained) based on the ultrasonic echo signals at any step after beam forming.

The ultrasonic probe 101 may generally include an array of a plurality of array elements. All or part of the array elements of the ultrasonic probe 101 may participate in the transmission of ultrasonic waves each time an ultrasonic wave is transmitted. At this time, each array element or each part of the array elements involved in the transmission of ultrasonic waves may be excited by emission pulses and may transmit ultrasonic waves, respectively. The ultrasonic waves transmitted by these array elements may be superimposed during propagation to form a synthetic ultrasonic beam that is transmitted to a scanned target. In some embodiments, the synthetic ultrasonic beam is the one transmitted to the field of view including the junction band.

In some embodiments, the processor 105 may perform scan control on the ultrasonic probe 101 which may carry out transmission and reception under scan control, and the beam forming unit 104 may perform corresponding beam forming on the received echo signals so as to reconstruct an image of the scanned area with a plurality of beam-formed lines. Under collaborative work of the processor 105, the transmitting circuit 102, the receiving circuit 103 together with the transmitting/receiving selection switch 107, and the ultrasonic probe 101, various scan modes may be performed as desired on the target tissue such as a uterine site, including but being not limited to conventional scan mode (such B-mode), and non-conventional scan mode dedicated to measurement of the peristalsis information about the portion of interest of the junction band.

The processor 105 may be a central processing unit (CPU) or some other form of processing unit having data processing capabilities and/or instruction execution capabilities, and may control other components of the ultrasonic imaging apparatus 100 to carry out desired functions.

In some embodiments, the processor 105 may be configured to perform processes including recognition of the portion of interest of the junction band, analysis of the motion information about the portion of interest of the junction band, and analysis of the peristalsis information about the portion of interest of the junction band. As used herein, the term "portion of interest of the junction band" may include a portion of a junction band corresponding to the peristalsis information about a junction band that a user needs to obtain, or a portion of a junction band corresponding to the motion information about a junction band that is acquired firstly by the user to obtain the peristalsis information about a junction band. The term "portion of interest of the junction band" may be an entire junction band, or only a part of the junction band. For the "portion of interest of the junction band", the peristalsis information thereabout may be directly "concerned", or the motion information and recognition thereof may be indirectly "concerned" due to the computation of the peristalsis information. In some embodiments, the processor 105 may be further configured to perform processes including 2D image synthesis, 3D image reconstruction, etc. corresponding to various ultrasonic imaging modes. Under the conventional B mode, 2D image synthesis may perform the processing of the conventional B mode; and under other conventional modes, 2D image synthesis may also perform the processing such as color imaging, PW imaging, etc.

In some embodiments, the processor 105 may obtain the motion information about the portion of interest of the junction band by using speckle tracking. For example, for an intensity value of a pixel at a certain position of an ultrasonic image at a certain moment, a search may be performed at surrounding of the certain position of the ultrasonic image at other moment to find a position with the maximum correlation, and the difference between the two positions is the displacement between the two moments. This is to illustrate the motion information analyzed and processed by the processor 105 by taking the analysis of the ultrasonic image of the field of view including the junction band to obtain the motion information about the portion of interest of the junction band as an example. It should be noted, however, the motion information analysis may be based on ultrasonic echo signals rather than ultrasonic images and may be performed on a target region different from the portion of interest of the junction band (e.g. but not limited to, the entire field of view of the junction band, a target region including the portion of interest of the junction band, etc.), which will not be described in detailed herein. In still other embodiments, the Doppler information about the ultrasonic echo signals may be analyzed to calculate the velocity of tissue at one or more positions of the junction band; and other motion information such as displacement, acceleration and strain may then be calculated based on the velocity of the tissue. It should be noted that the acceleration may be obtained by further gradienting the velocity in the time direction, and the strain may be obtained by calculating the gradient of the displacement in the direction of spatial transverse position.

As used herein, the term "peristalsis information" may refer to information associated with the peristaltic behavior of the junction band, which may be intuitive parameters such as the number of peristaltic waves, intensity, spectral parameters, significant motion regions with intensity exceeding a threshold, direction of transmission, and propagation velocity, and may also be motion information embodying the peristaltic process of the junction band, such as real-time motion amplitude, direction of motion, and the like, which may be presented in a parametric manner or in a graphical manner, as long as the presentation of the "peristalsis information" can help users understand and grasp the movement characteristics of the peristalsis of the junction band. For example, the time-domain displacement curves of multiple locations on the junction band may be compared and observed by the user or an automated analysis algorithm; and according to the sequence of motion, the transmission direction of the peristaltic waves on the junction band may be judged, and the transmission velocity, transmission distance and transmission time of the peristaltic waves may be calculated accordingly, which may thus also be taken as "peristalsis information". For another example, by setting a certain motion amplitude threshold, each position of the junction band where the motion amplitude exceeds the threshold may be marked as a region where significant peristalsis occurs, and any one of the motion amplitude threshold and the region where significant peristalsis occurs may also be referred to as the "peristalsis information" as desired. For yet another example, a parameter representing a peristaltic motion characteristic of the junction band, such as the amplitude, frequency, direction, intensity, movement time, range of motion, transmission velocity, transmission distance, transmission time and peristalsis interval of the peristaltic waves, obtained by further calculation based on motion information, may also be referred to as "peristalsis information".

The human-machine interaction device 106 may be connected to the processor 105. For example, the processor 105 may, via an external input/output port, connected to the human-machine interaction device 106 which can detect an information inputted by a user. The input information may be, for example, a control instruction for the transmitting and receiving sequence of ultrasonic waves, an input instruction for operations on the ultrasonic images such as editing and labeling, or other types of instructions. Generally, operation instructions obtained by the user when editing, labeling and measuring the ultrasonic images are used for measurement of the target tissue. The human-machine interaction device 106 may include one or a combination of: a keyboard, a mouse, a scroll wheel, a trackball, a mobile input device (such as a mobile device with a touch-sensitive display screen, a cell phone, etc.), a multi-function knob, and so on. Accordingly, the corresponding external input/output port may be a wireless communication module, a wired communication module, or a combination of both. The external input/output port may also be implemented based on USB, bus protocols such as CAN, and/or wired network protocols.

The human-machine interaction device 106 may also include a display that can display the ultrasonic images obtained by the processor 105. Moreover, while displaying the ultrasonic images, the display can also provide a graphical interface with one or more controlled objects set thereon so as to offer the user with human-machine interaction. The controlled objects may be controlled by operation instructions inputted by the user via the human-machine interaction device 106, thereby performing corresponding control operations. For example, an icon, which may be presented on the graphical interface, may be manipulated using the human-machine interaction device to perform specific functions, such as labeling the ultrasonic images. In practice, the display may be a touch screen display. Furthermore, the display in this embodiment may include one or more displays.

In the embodiment, the processor 105 may be configured to obtain the motion information about the portion of interest of the junction band according to the ultrasonic echo signals or multiple frames of the ultrasonic images, generate the peristalsis information about the portion of interest of the junction band according to the motion information about the portion of interest of the junction band, and simultaneously control the display of the human-machine interaction device 106 to display the peristalsis information about the portion of interest of the junction band. In some examples, the processor 105 may, in response to a user's operation associated with the appearance of the peristalsis information, control the display of the human-machine interaction device 106 to display the peristalsis information in a corresponding manner (such as but not limited to a graphical manner, a manner of graph associating with parameter, and a manner of switching the display of multiple types of portions of interest), so that the user can easily understand the peristalsis information about the portion of interest of the junction band in an accurate and comprehensive way.

The measurement of the peristalsis information about the portion of interest of the junction band in the present disclosure may be performed under a first ultrasonic scan mode which is a conventional scan mode of the uterus. The B mode is taken as an example in the following, to which is not limited herein, as long as it can present the anatomical structure of the uterine site in real time. Also, the measurement may be performed under a second ultrasonic scan mode which is different from the conventional scan mode of the uterus.

Figures 2A, 2B:
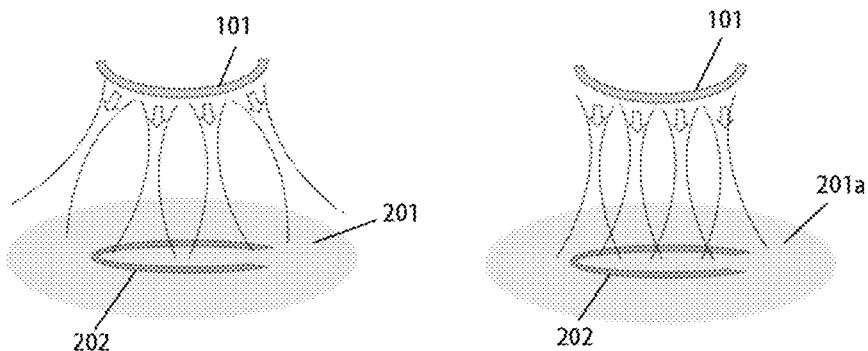
FIG. 2(a) is a schematic diagram of a first ultrasonic scan mode of the ultrasonic imaging apparatus according to an embodiment of the present disclosure.
FIG. 2(b) is a schematic diagram of a second ultrasonic scan mode of the ultrasonic imaging apparatus according to an embodiment of the present disclosure.

FIG. 2(*a*) schematically shows the first ultrasonic scan mode of the ultrasonic imaging apparatus according to an embodiment of the present disclosure. The measurement of the peristalsis information according to the present disclosure may be implemented based on the first ultrasonic echo signals or the first ultrasonic image generated therefrom obtained by performing the first ultrasonic scan on the field of view 201 including the junction band 202 under the first ultrasonic scan mode. Note that the so-called field of view 201 including the junction band may only include the junction band 202; and besides the junction band 202, it may also include other tissues such as but not limited to the myometrium and the endometrium. In some embodiments, the first ultrasonic scan mode may adopt B mode and may share the transmission and reception link with conventional B-mode imaging; also, the scanning parameters such as transmitting position, transmitting frequency, focus position, transmitting time interval, and transmitting range of the ultrasonic sequence therebetween may be the same. Similar to B-mode ultrasonic images, a frame of the ultrasonic image obtained by the first ultrasonic scan may usually be obtained by transmitting and receiving sequences of multiple transverse positions within the field of view 201, using either traditional focused waves or planar waves. A series of ultrasonic echo signals (also referred to as the first ultrasonic echo signals) may be obtained by repeated transmission. On the one hand, the first ultrasonic echo signals may be performed with B-mode data processing to obtain a series of B-mode images (also referred to as the first ultrasonic images generated accordingly), and the position, shape and movement of the junction band can be seen by observing the B-mode images. On the other hand, the first ultrasonic echo signals and the first ultrasonic images generated therefrom may be performed with detection and processing of peristaltic waves to obtain motion states of the junction band associated with the peristaltic waves at various moments, such as displacement, velocity, acceleration. As such, the detection of the peristaltic waves is convenient, saving scanning time. In this way, the B-mode ultrasonic images can be observed while obtaining detection results of the peristaltic waves, which is convenient for doctors to compare.

FIG. 2(*b*) schematically shows the second ultrasonic scan mode of the ultrasonic imaging apparatus according to an embodiment of the present disclosure. The measurement of the peristalsis information about the junction band may also be implemented based on the second ultrasonic echo signals and the second ultrasonic image generated therefrom obtained by performing the second ultrasonic scan on the field of view 201*a* including the junction band 202. As shown in FIG. 2(*b*), the second ultrasonic scan mode may adopt a transmitting and receiving sequence different from that adopted under the first ultrasonic scan mode which is a conventional scan mode of the uterus, such that the second ultrasonic scan has a higher detection frame rate and/or is more specific to a detection direction of the junction band compared with the first ultrasonic scan, obtaining a more precise motion state more quickly. Being more specific to the detection direction of the junction band 202 is referred to being more focused on the detection direction of the junction band 202, and a region deviating from the junction band 202 is not covered or less covered, so that the scanning range is only carried out on the whole or part of the junction band that is concerned as needed. As such, image information obtained by imaging can be more precise, thereby facilitating the more acquisition of more detailed motion states. Specifically, any one of the scanning parameters of the ultrasonic sequences under the second ultrasonic scan mode, such as transmitting waveform, transmitting position, transmitting frequency, focus position, transmitting time interval and transmitting range, can be set independently with the conventional scan mode.

In some embodiments, the first ultrasonic scan may be performed alternately with the second ultrasonic scan, such that the ultrasonic image including the junction band obtained under the conventional mode can be observed synchronously with the detection of the peristalsis information about the junction band. When the two scan modes are executed alternately, interpolation can be performed in time domain to obtain more frame data, so as to improve the detection frame rate and obtain clearer motion state.

Figure 3:
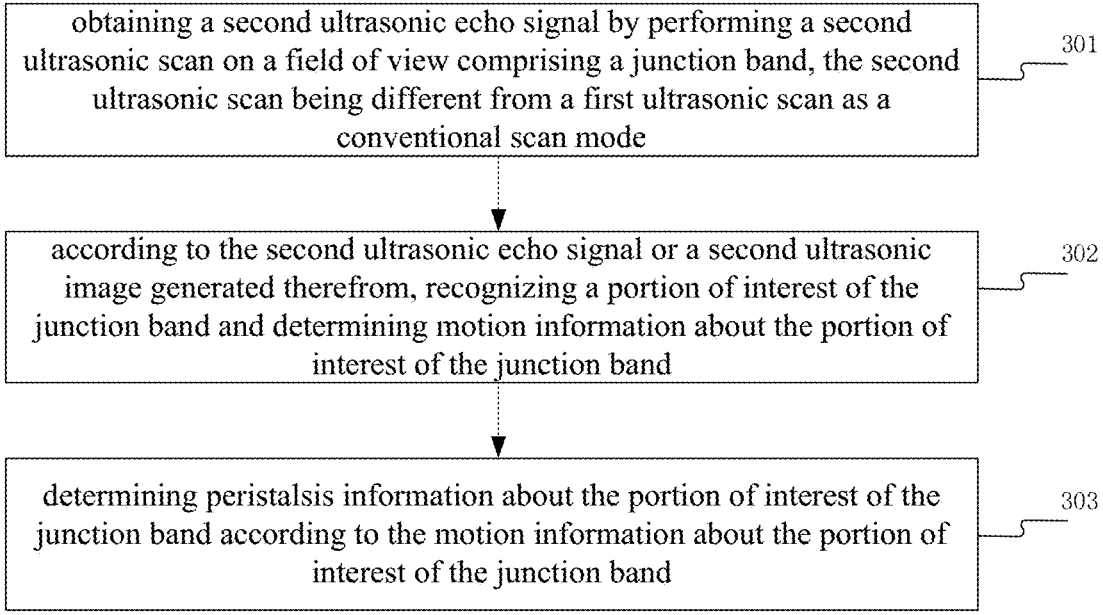
FIG. 3 is a flowchart of the measuring method for peristalsis information based on ultrasonic scanning according to an embodiment of the present disclosure.

FIG. 3 shows a flowchart of the measuring method for peristalsis information based on ultrasonic scanning which is performed dependent on the second ultrasonic scan mode according to an embodiment of the present disclosure. As shown in FIG. 3, the measuring method may begin from step 301 in which the second ultrasonic echo signal is obtained by performing the second ultrasonic scan on the field of view including the junction band, wherein the second ultrasonic scan is different from the first ultrasonic scan which is the conventional scan mode of the uterus. In step 302, according to the second ultrasonic echo signal or the second ultrasonic image generated therefrom, the portion of interest of the junction band is recognized and the motion information about the portion of interest of the junction band is determined. In step 303, according to the motion information about the portion of interest of the junction band, the peristalsis information about the portion of interest of the junction band is determined. In this way, the source of the peristaltic waves of the endometrium—the peristaltic waves of the junction band can be performed with rapid and precise quantitative analysis, providing a more rapid and accurate motion state for the portion of interest of the junction band, thus obtaining a more precise peristalsis information quickly. The regular contraction of muscle cells in the junction band may produce peristaltic waves, and the regularity of the peristalsis information thereabout may be higher with being rarely affected by irregular peristalsis generated by such as endometrium. Accordingly, the peristalsis information about the portion of interest of the junction band can be obtained more quickly and accurately by using the measuring method herein, thereby providing a more effective reference for such as endometrium receptivity and/or uterine diseases.

Based on the second ultrasonic echo signal and the second ultrasonic image generated therefrom, the portion of interest of the junction band may be recognized by various ways. For example, the portion of interest of the junction band may be recognized automatically based on echo signals, B-mode image grayscale, image edge recognition and extraction, or artificial intelligence methods (such as deep learning). For another example, recognition may be performed manually, or semi-automatically or automatically by considering prior knowledge of anatomy of the junction band and the endometrium and/or the myometrium. The following is a description of the recognition of the portion of interest of the junction band based on the second ultrasonic image, to which is not limited herein; and the relevant description can also be adjusted to apply to the recognition of the portion of interest of the junction band based on the second ultrasonic echo signal, or the recognition of the portion of interest of the junction band based on the first ultrasonic echo signal or the first ultrasonic image generated therefrom, which will not be repeated here.

Figure 5:
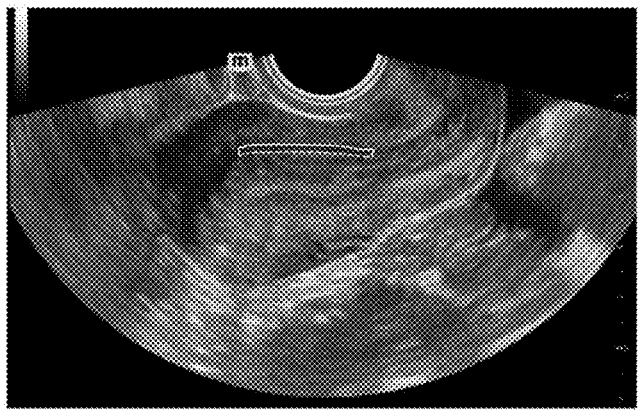
FIG. 5 is a representation of a second example of recognizing the portion of interest of the junction band based on a second ultrasonic image of the field of view including the junction band according to an embodiment of the present disclosure.
Figure 6:
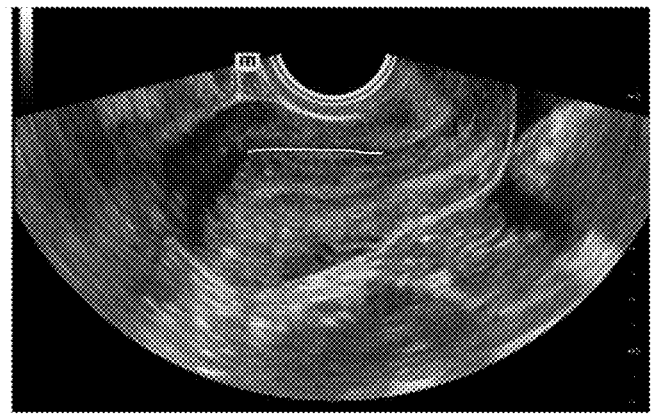
FIG. 6 is a representation of a third example of recognizing the portion of interest of the junction band based on a second ultrasonic image of the field of view including the junction band according to an embodiment of the present disclosure.
Figure 7:
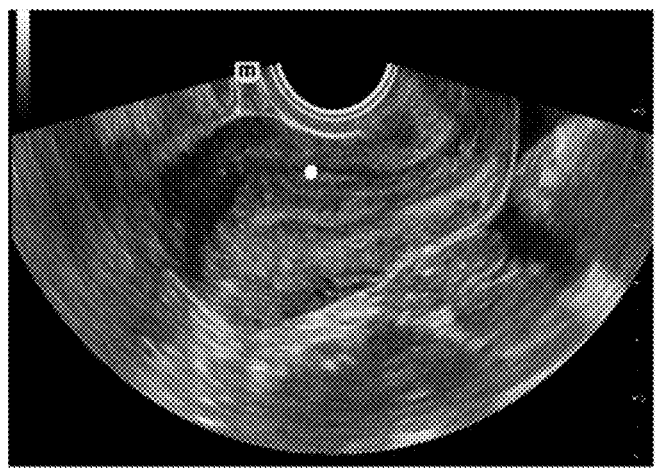
FIG. 7 is a representation of a fourth example of recognizing the portion of interest of the junction band based on a second ultrasonic image of the field of view including the junction band according to an embodiment of the present disclosure.

In some embodiments, the portion of interest of the junction band may be extracted manually by the user based on the second ultrasonic image. For example, the portion of interest of the junction band may be an entire junction band (see FIG. 4), a single or multiple regions (see FIG. 5), a line (the number of which may be single or several, and it may be a straight line, a curve line, a folded line, etc., see FIG. 6), or a point (the number of which may be single or several, see FIG. 7). Manual labeling of the portion of interest of the junction band by the user throughout the process is conducive to accurately extracting a thin, curved junction band sandwiched between the endometrium and the myometrium, but there is still room for improvement in reducing the user's operating load.

Figure 4:
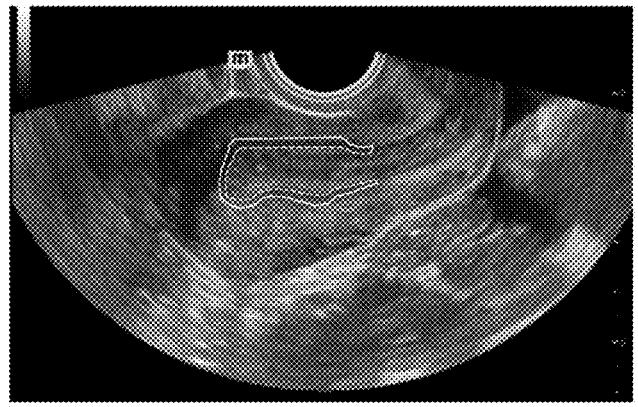
FIG. 4 is a representation of a first example of recognizing the portion of interest of the junction band based on a second ultrasonic image of the field of view including the junction band according to an embodiment of the present disclosure.

In some embodiments, the portion of interest of the junction band may be recognized efficiently and accurately in a semi-automatic or automatic manner by considering prior knowledge of anatomy of the junction band and the endometrium and/or the myometrium. As shown in FIG. 4, the endometrium may be marked manually or automatically (such as but not limited to an outer edge of the endometrium adjacent to the junction band, as shown by the lower dashed line in FIG. 4), and the outer edge of the marked endometrium expanding automatically outward a predetermined thickness (as shown by the solid line in FIG. 4) may be taken as the portion of interest of the junction band. The thickness can be set based on the prior knowledge of anatomy of the junction band and the endometrium, or be adjusted manually by the user. The difficulty of the recognition of the endometrium is significantly less than that of junction band, so the portion of interest of the junction band can be recognized more efficiently and accurately by first recognizing the endometrium that is easily recognizable and then a corresponding simple processing such as expanding outward performed by considering the prior knowledge of anatomy of the junction band and the endometrium such as expanding outward. Meanwhile, the endometrium recognized first may also provide useful reference for users.

It may also be possible to use other ways to first recognize reference tissues (referred to as endometrium and/or myometrium for the junction band) and then perform simple processing by considering the prior knowledge of anatomy of the junction band and the reference tissues to more efficiently and accurately recognize the portion of interest of the junction band. For example, the myometrium may be marked manually or automatically, and an inner edge of the marked myometrium expanding automatically inward a predetermined thickness may be taken as the portion of interest of the junction band. For another example, the endometrium and the myometrium may be marked manually or automatically, and an interlayer of a low grayscale value between the marked endometrium and myometrium may be automatically recognized as the portion of interest of the junction band.

In addition to recognize the easily recognizable reference tissues, it is also possible to recognize a simpler geometric structure which is then expanded to obtain the portion of interest of the junction band; as such, the recognition of the portion of interest of the junction band with a larger range and/or dimension can be implemented with a computational load equivalent to that required by the recognition of the simpler geometric structure. For example, a point on the junction band may be recognized and then be expanded to obtain a line as the portion of interest of the junction band; or, it is possible to recognize a first line on the junction band, and the first line may be expanded to obtain a second line as the portion of interest of the junction band. For another example, the recognized point or line on the junction band may be expanded to obtain a single or multiple regions as the portion of interest of the junction band. For yet another example, the single or multiple regions on the junction band may be directly recognized as the portion of interest of the junction band; or the recognized single or multiple regions may be expanded to obtain a single or multiple regions with a larger range.

In some embodiments, besides serving as the basis for the expansion, the simpler first-recognized geometric structure may also, together with the expanded structure, be used as the portion of interest of the junction band, such that the peristalsis information about the tissue in the junction band corresponding to different fields of view can be obtained for users. Specifically, for example, in a case where the line as the portion of interest of the junction band is obtained by expanding the recognized point on the junction band, the recognized point and the obtained line are served as the portion of interest of the junction band. For another example, in a case where the single or multiple regions as the portion of interest of the junction band are obtained by expanding the recognized point or line on the junction band, the recognized point or line together with the obtained single or multiple regions may be served as the portion of interest of the junction band. In some embodiments, for example, in a case where the single or multiple regions are recognized directly, a line may be generated ("reduced") based on the recognized single or multiple regions and may be, together with the single or multiple regions, served as the portion of interest of the junction band. That is, a portion of interest with a larger range may firstly be recognized and then be reduced to generate another portion of interest, and both of which are served as the portion of interest of the junction band. In a case where there are points and lines, lines and regions before and after expansion respectively, the structures before and after expansion can be served as the portion of interest of the junction band for analysis of the peristalsis information, providing users with comprehensive and sufficient peristalsis information.

Specifically, the peristalsis information about the points, the lines and the regions may present different levels of peristalsis information respectively. In some embodiments, the peristalsis information about the portion of interest of the junction band may be displayed at least in a graphic manner.

The following describes the portion of interest of the junction band of at least one geometric structure of the points, the lines, the single region and multiple regions, respective applicable graphical display thereof, as well as the different levels of the peristalsis information presented.

Figure 8:
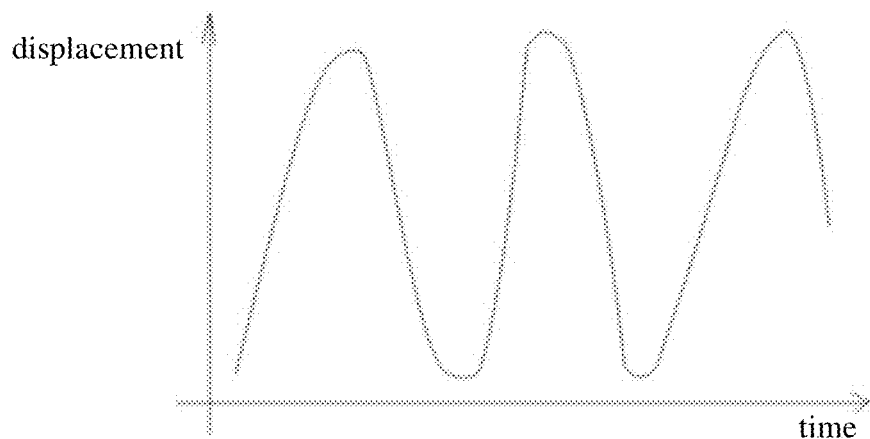
FIG. 8 is an exemplary representation of displacement curve in time domain for the peristalsis information about the portion of interest of the junction band when the portion of interest of the junction band is a point according to another embodiment of the present disclosure.

In a case where the portion of interest of the junction band is a point, the peristalsis information about the portion of interest of the junction band may be presented in a displacement curve in time domain (as shown in FIG. 8). The presented displacement curve in time domain may be able to determine an intensity, a frequency and a significant movement time of the peristaltic waves.

Figure 9A:
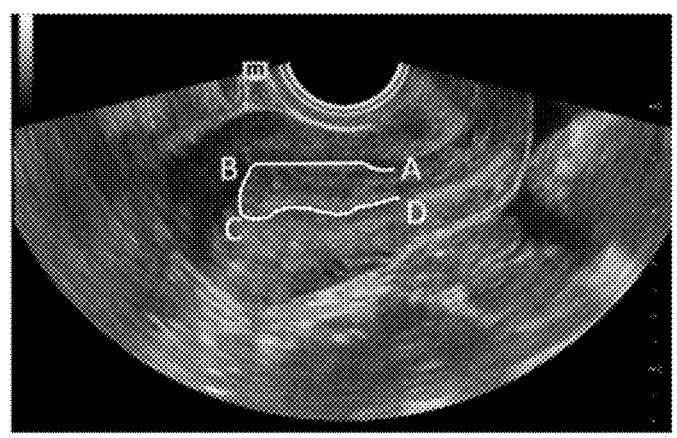
FIG. 9(a) is a diagram of the portion of interest of the junction band which is a line according to another embodiment of the present disclosure.
Figure 9B:
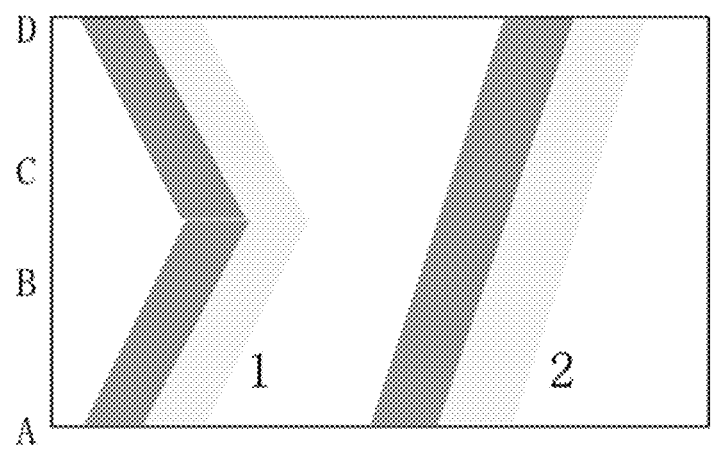
FIG. 9(b) is an exemplary representation of a two-dimensional space-time diagram of the peristalsis information about the portion of interest of the junction band when the portion of interest of the junction band is a line according to another embodiment of the present disclosure.

In a case where the portion of interest of the junction band is a line (a curve A-B-C-D as shown in FIG. 9(*a*)), the peristalsis information about the portion of interest of the junction band may be presented in a two-dimensional space-time diagram. As shown in FIG. 9(*b*), the horizontal axis represents time and the vertical axis represents spatial position (obtained by strengthening and mapping the curve A-B-C-D in FIG. 9(*a*)). In the two-dimensional space-time diagram shown in FIG. 9(*b*), dark gray and light gray in pairs represent a peristaltic wave, and there are two peristaltic waves, peristaltic wave 1 and peristaltic wave 2. The peristaltic wave 1 is transmitted in a direction from AD to BC, namely cervical-fundus direction; and the peristaltic wave 2 is transmitted along A→B→C→D, namely "rotational" peristaltic wave. The two-dimensional space-time diagram presented for the line(s) can be used to determine the number, propagation direction and propagation velocity of the peristaltic waves.

Figure 10A:
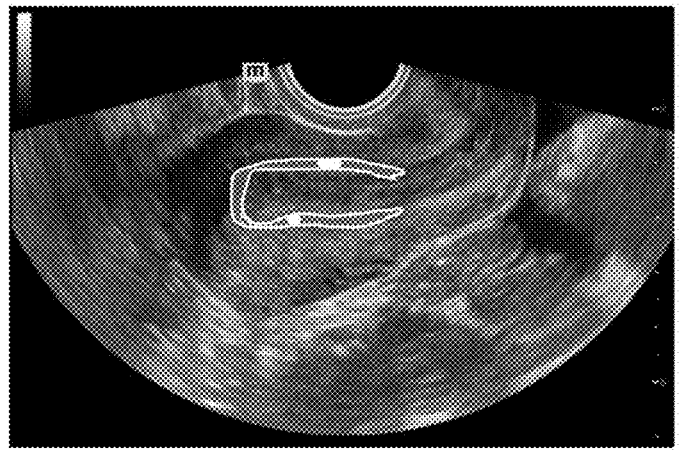
FIG. 10(a) is a schematic diagram of a first display mode of the peristalsis information when the portion of interest of the junction band is a or multiple regions according to yet another embodiment of the present disclosure.
Figure 10B:
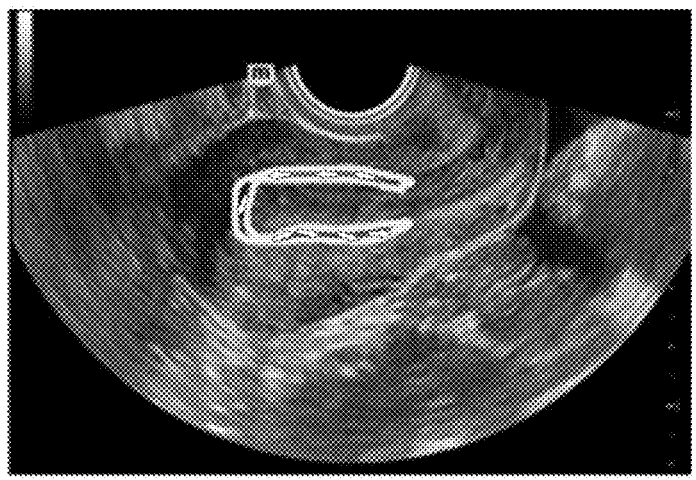
FIG. 10(b) is a schematic diagram of a second display mode of the peristalsis information when the portion of interest of the junction band is a or multiple regions according to yet another embodiment of the present disclosure.

In a case where the portion of interest of the junction band is a single region or multiple regions, the motion information about the portion of interest of the junction band at each moment may be presented either in color coding (as shown in FIG. 10(*a*)) or in arrow form (as shown in FIG. 10(*b*)) (real-time motion information represents the characteristics of peristalsis movement, so it is also referred to as the peristalsis information). As such, the motion information representing the characteristics of peristalsis movement in the region can be viewed more intuitively and in real time. For another example, when the portion of interest of the junction band is a single or multiple regions, the peristalsis information about the portion of interest of the junction band at each moment may be presented in a three-dimensional space-time diagram. The three-dimensional space-time diagram may be obtained by adjusting the spatial position in the two-dimensional space-time diagram to be a region. The three-dimensional space-time diagram presented for the region can be used to determine the number, propagation direction and propagation velocity of the peristaltic waves in space.

Figure 11:
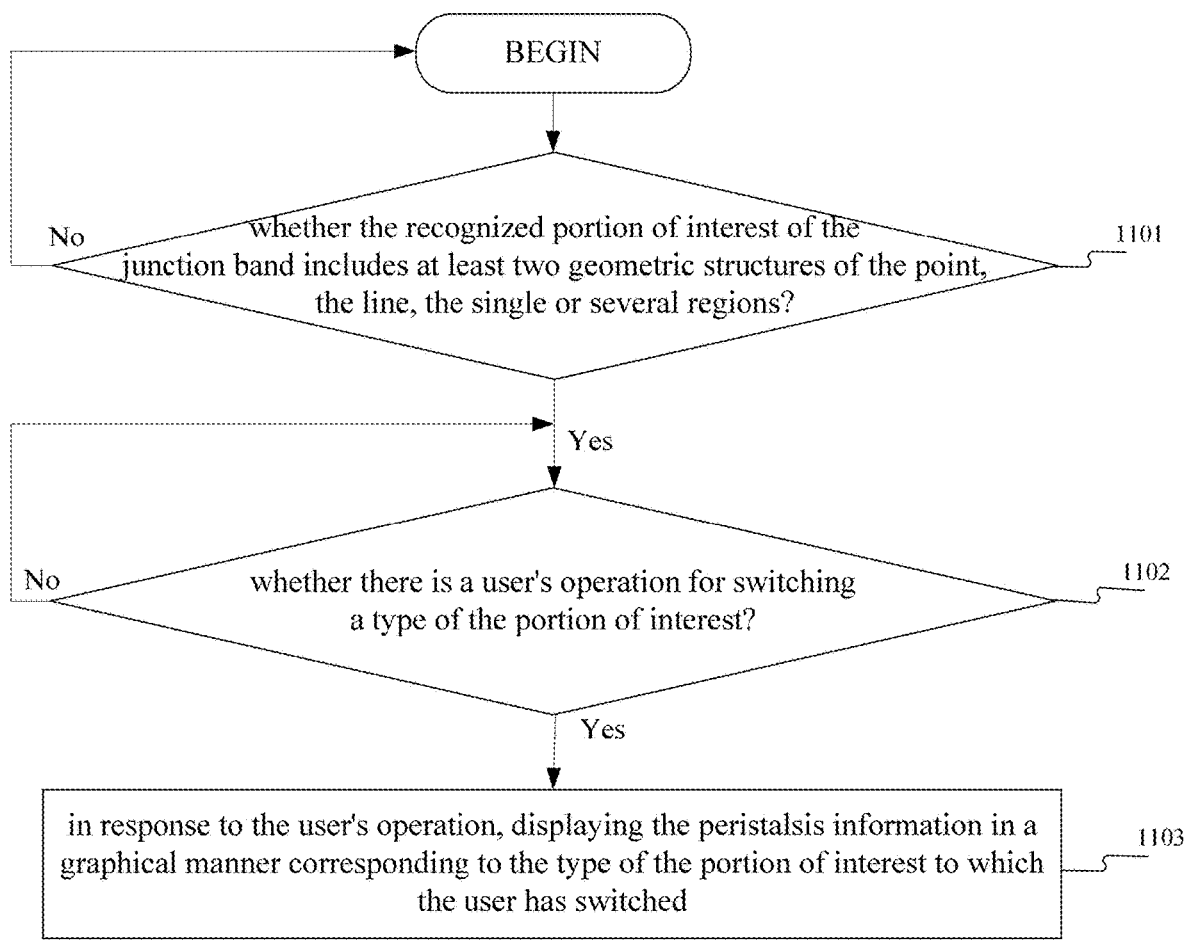
FIG. 11 is a flowchart of displaying the process of the peristalsis information about the portion of interest of the junction band of various geometric structures when the portion of interest of the junction band includes at least two geometric structures according to another embodiment of the present disclosure.

When the recognized portion of interest of the junction band comprises at least two of a point, a line, a single or multiple regions, the peristalsis information in a graphical manner corresponding to at least two geometric structures of the portion of interest respectively may be displayed in a comparative or switchable manner; as such, it is helpful for users to obtain peristalsis information that in graphical presentation of various geometric structures and embodying different levels. Specifically, as shown in FIG. 11, it is possible to determine whether the recognized portion of interest of the junction band includes at least two geometric structures of a point, a line, a single or multiple regions (step 1101). When the recognized portion of interest of the junction band includes at least two geometric structures of a point, a line, a single or multiple regions, it is possible to detect whether there is a user's operation for switching a type of the portion of interest (step 1102); and when receiving the user's operation, the peristalsis information in a graphical manner corresponding to the type of the portion of interest to which the user has switched may be displayed in response to the user's operation (step 1103).

In some embodiments, peristalsis parameters may be displayed in association with the peristalsis information in a graphical manner about the portion of interest of the junction band. The presentation of the peristalsis information may be realized in a visual manner, such as displaying as shapes, words or icons, or in an auditory manner such as playing voice, etc.

Figure 12:
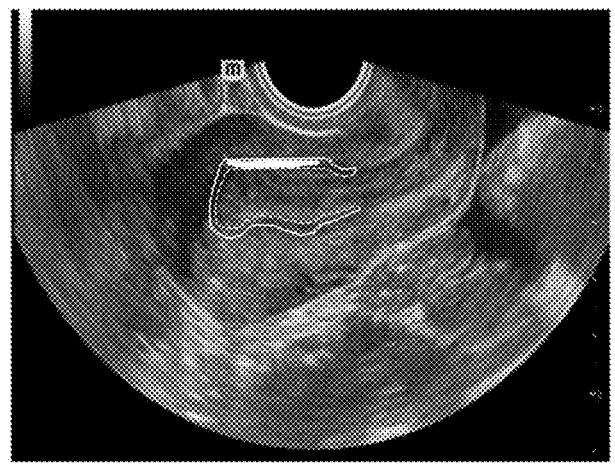
FIG. 12 is a representation of a fifth example of recognizing the portion of interest of the junction band based on a second ultrasonic image of the field of view including the junction band according to an embodiment of the present disclosure.

In some embodiments, it is possible to make a target region where the motion information is analyzed include a target region in which the peristalsis information is analyzed; that is, the portion of interest of the junction band may include a first portion of interest for motion information analysis (a region enclosed by a curve in FIG. 12) and a second portion of interest for peristalsis information analysis included in the first portion of interest (a color block in FIG. 12). The second ultrasonic echo signal may be obtained by performing the second ultrasonic scan on the first portion of interest. The motion information about the first portion of interest of the junction band may be determined according to the second ultrasonic echo signal or the second ultrasonic image generated therefrom. The motion information about the second portion of interest of the junction band may be extracted from the motion information about the first portion of interest of the junction band. Then the peristalsis information about the second portion of interest of the junction band may be determined according to the extracted motion information about the second portion of interest of the junction band. Besides the second portion of interest for peristalsis information analysis, the first portion of interest for motion information analysis may also include an additional peripheral region, which can provide more comprehensive reference for motion information for the peristalsis information analysis at the periphery of the portion of interest, making the peristalsis information about the second portion of interest more accurate and offering users with more comprehensive reference.

In some embodiments, as shown in FIGS. 9(*a*), 10(*a*), 10(*b*) and 12, the second ultrasonic image may be displayed, and the portion of interest of the junction band may be highlighted on the displayed second ultrasonic image. In this way, by performing only the second ultrasonic scan mode, the recognition of the portion of interest of the junction band, the analysis of the peristalsis information, the presentation of both the portion of interest of the junction band and the peristalsis information may be realized. In some embodiments, the portion of interest of the junction band may be highlighted on the first ultrasonic image obtained under the first ultrasonic scan mode as the conventional ultrasonic scan mode. The first ultrasonic scan mode may be carried out independently to complete the recognition of the portion of interest of the junction band, the analysis of the peristalsis information, and the presentation of both the portion of interest of the junction band and the peristalsis information (which will be describe in detailed hereinafter with reference to FIG. 13); or it may be performed alternately with the second ultrasonic scan mode to coordinate the recognition of the portion of interest of the junction band, the analysis of the peristalsis information, and the presentation of both the portion of interest of the junction band and the peristalsis information. Specifically, the first ultrasonic echo signal may be obtained by executing the first ultrasonic scan on the field of view including the junction band, the first ultrasonic image may be generated based on the first ultrasonic echo signal to display the first ultrasonic image, and the portion of interest of the junction band may be highlighted on the displayed first ultrasound image.

Figure 13:
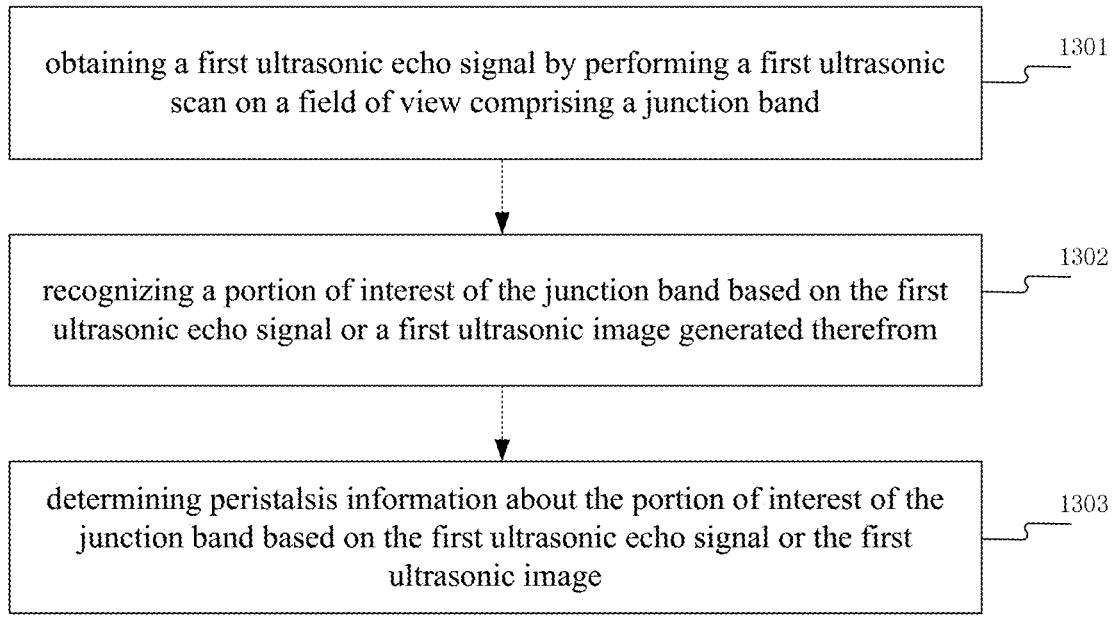
FIG. 13 is a flowchart of the measuring method for peristalsis information based on ultrasonic scanning according to another embodiment of the present disclosure.

FIG. 13 schematically shows a flowchart of a measuring method for peristalsis information based on ultrasonic scanning according to another embodiment of the present disclosure. Different from the measuring method mentioned above, this method may be realized under the first ultrasonic scan mode without relying on an unconventional scanning mode such as the second ultrasonic scan mode. As an example, the measuring method can be achieved in the conventional B mode; thus with existing ultrasound As shown in FIG. 13, the first ultrasonic echo signal may be obtained by performing the first ultrasonic scan on the field of view including the junction band in step 1301. In step 1302, the portion of interest of the junction band may be recognized based on the first ultrasonic echo signal and the first ultrasonic image generated therefrom. The implementation of recognizing of the portion of interest of the junction band based on the second ultrasonic echo signal and the second ultrasonic image generated therefrom according to the embodiments of the present disclosure may be combined, which will not be described in detail here. After the portion of interest of the junction band is recognized, the peristalsis information about the portion of interest of the junction band may be determined based on the first ultrasonic echo signal and the first ultrasonic image (step 1303). The implementation of determining the motion information about the portion of interest of the junction band based on the second ultrasonic echo signal and the second ultrasonic image generated therefrom according to the embodiments of the present disclosure, as well as that of the peristalsis information about the portion of interest of the junction band determined therefrom, may be combined, which will not be described in detail here. Further, the recognition of the portion of interest of the junction band may be used for the extraction of the motion information about the portion of interest of the junction band from the first ultrasonic echo signal or the first ultrasonic image to determine the peristalsis information about the portion of interest of the junction band, or it may be used for a wider range of the peristalsis information about the portion of interest of the junction band from the first ultrasonic echo signal or the first ultrasonic image to extract the peristalsis information about the portion of interest of the junction band.

Figure 14A:
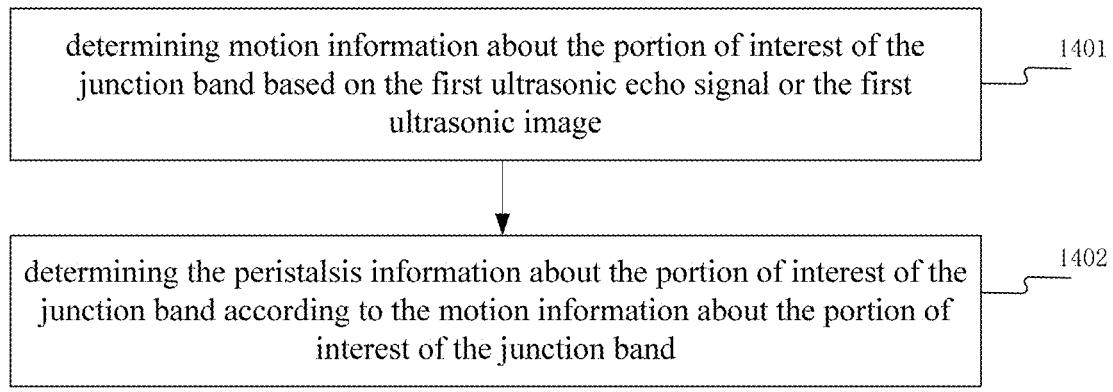
FIG. 14(a) is a flowchart of a first exemplary process in which the peristalsis information about the portion of interest of the junction band is determined based on the first ultrasonic echo signal or the first ultrasonic image according to another embodiment of the present disclosure.
Figure 14B:
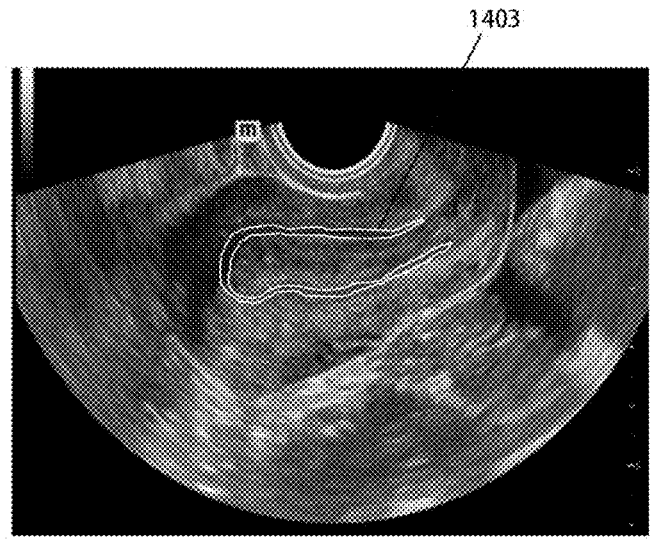
FIG. 14(b) is a diagram of the recognized portion of interest of the junction band in the first exemplary process.

FIG. 14(a) schematically shows a flowchart of a first exemplary process in which the peristalsis information about the portion of interest of the junction band is determined based on the first ultrasonic echo signal or the first ultrasonic image according to another embodiment of the present disclosure. After the portion of interest of the junction band is recognized (as shown by a curve 1403 in FIG. 14(b)), the motion information about the portion of interest of the junction band may be determined based on the first ultrasonic echo signal or the first ultrasonic image in step 1401. In step 1402, the peristalsis information about the portion of interest of the junction band may be determined according to the motion information about the portion of interest of the junction band.

The peristalsis information about the portion of interest of the junction band may also be determined by other ways based on the first ultrasonic echo signal or the first ultrasonic image.

Figure 15A:
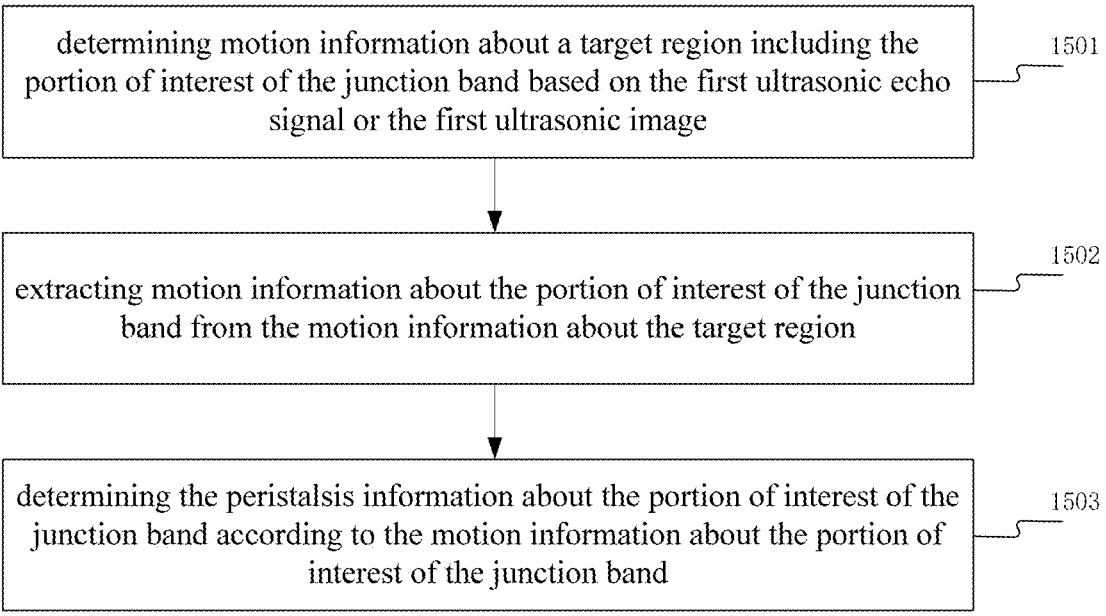
FIG. 15(a) is a flowchart of a second exemplary process in which the peristalsis information about the portion of interest of the junction band is determined based on the first ultrasonic echo signal or the first ultrasonic image according to another embodiment of the present disclosure.
Figure 15B:
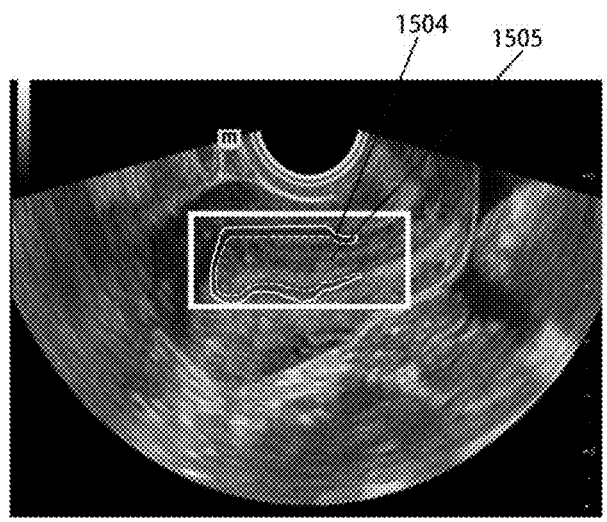
FIG. 15(b) is a diagram of the target region comprising the portion of interest of the junction band together with the portion of interest of the junction band in the second exemplary process.

For example, as shown in FIG. 15(a), in step 1501, motion information about a target region including the portion of interest of the junction band (as shown by a box 1505 in FIG. 15(b)) may be determined based on the first ultrasonic echo signal or the first ultrasonic image. In step 1502, motion information about the portion of interest of the junction band (as shown by a curve 1504 in FIG. 15(b)) may be extracted from the motion information about the target region 1505. In step 1503, the peristalsis information about the portion of interest of the junction band 1504 may be determined based on the motion information about the portion of interest of the junction band 1504.

For another example, the target region 1505 may be expanded to the entire field of view of the first ultrasonic scan. Correspondingly, the motion information about the field of view may be determined based on the first ultrasonic echo signal or the first ultrasonic image; the motion information about the portion of interest of the junction band may be extracted from the motion information about the field of view; and the peristalsis information about the portion of interest of the junction band may be determined according to the motion information about the portion of interest of the junction band.

For yet another example, the motion information about the target region may be determined based on the first ultrasonic echo signal or the first ultrasonic image. The peristalsis information about the target region may be determined in accordance with the motion information about the target region. Then, the peristalsis information about the portion of interest of the junction band may be extracted from the peristalsis information about the target region.

In some embodiments, besides the portion of interest of the junction band, the target region may also include at least part of at least one of the myometrium and the endometrium. In this way, it is possible to more accurately and conveniently recognize the portion of interest of the junction band in combination with the result of the easily identifiable recognizable myometrium and/or endometrium.

Specifically, the portion of interest of the junction band may be, based on the first ultrasonic image, recognized manually, or recognized semi-automatically or automatically by considering prior knowledge of anatomy of the junction band and the endometrium and/or the myometrium. The portion of interest of the junction band may be recognized semi-automatically or automatically by considering prior knowledge of anatomy of the junction band and the endometrium and/or the myometrium through any one of the following ways: marking the endometrium manually or automatically and taking an outer edge of the marked endometrium expanding automatically outward a predetermined thickness as the portion of interest of the junction band; marking the myometrium manually or automatically and taking an inner edge of the marked myometrium expanding automatically inward a predetermined thickness as the portion of interest of the junction band; and marking the endometrium and the myometrium manually or automatically and recognizing automatically an interlayer of a low grayscale value between the marked endometrium and myometrium as the portion of interest of the junction band. The recognition of the portion of interest of the junction band based on the second ultrasonic image mentioned above may also be applied to this example, which will not be repeated here.

In some embodiments, the recognized portion of interest of the junction band may include a first portion of interest and a second portion of interest included in the first portion of interest. The measuring method may specifically include: determining motion information about the first portion of interest of the junction band according to the first ultrasonic echo signal or the first ultrasonic image; extracting the motion information about the second portion of interest of the junction band from the motion information about the first portion of interest of the junction band; and determining the peristalsis information about the second portion of interest of the junction band according to the extracted motion information about the second portion of interest of the junction band. The details of the measuring method according to the second ultrasonic echo signal or the second ultrasonic image with reference to FIG. 12 mentioned above may also be combined here, so that the target region of analyzing motion information (e.g. displacement, velocity, acceleration, etc.) may include the target region of analyzing peristalsis information; that is, the portion of interest of the junction band may include the first portion of interest for motion information analysis and a second portion of interest included in the first portion of interest for peristalsis information analysis.

The implementation of the recognition of the portion of interest of the junction band based on the second ultrasonic echo signal or the second ultrasonic image mentioned above may also apply here.

Specifically, the portion of interest of the junction band may be recognized through any one of the following ways.

A point on the junction band may be recognized and the recognized point may be expanded to obtain a line as the portion of interest of the junction band. A first line on the junction band may be recognized and then be expanded to obtain a second line as the portion of interest of the junction band. The point or line on the junction band may be recognized and then be expanded to obtain a single region or multiple regions as the portion of interest of the junction band. The single region or multiple regions on the junction band may be recognized directly as the portion of interest of the junction band.

When the line as the portion of interest of the junction band is obtained by expanding the recognized point on the junction band, the recognized point together with the line obtained thereby may be taken as the portion of interest of the junction band. When the single region or multiple regions as the portion of interest of the junction band is obtained by expanding the recognized point or line on the portion of interest of the junction band, the recognized point or line, together with the single region or multiple regions obtain thereby, may be taken as the portion of interest of the junction band. When the single region or multiple regions are recognized directly, a line generated by the recognized single region or multiple regions, together with the single region or multiple regions, may be taken as the portion of interest of the junction band.

The implementation of the presentation of the recognized portion of interest of the junction band and the determined peristalsis information based on the second ultrasonic echo signal or the second ultrasonic image mentioned above may also apply here.

That is, the measuring method may also include: displaying the peristalsis information about the portion of interest of the junction band at least in a graphical manner.

In some embodiments, the portion of interest of the junction band may include at least one of a point, a line, a single region, and multiple regions; and the display of the peristalsis information about the portion of interest of the junction band at least in a graphic manner may specifically be implemented as follows. When the portion of interest of the junction band is the line, the peristalsis information about the portion of interest of the junction band may be presented in a two-dimensional space-time diagram capable of determining a number, a transmitting direction and a propagation velocity of peristaltic waves. When the portion of interest of the junction band is a point, the peristalsis information about the portion of interest of the junction band may be presented in a displacement curve in time domain capable of determining an intensity, a frequency and a significant movement time of peristaltic waves. When the portion of interest of the junction band is a single region or multiple regions, the peristalsis information about the portion of interest of the junction band may be presented in color coding or a three-dimensional space-time diagram.

In some embodiments, when the recognized portion of interest of the junction band comprises at least two of a point, a line, a single region or multiple regions, the peristalsis information in a graphical manner corresponding to at least two geometric structures of the portion of interest respectively may be displayed in a comparative or switchable manner.

In some embodiments, when the recognized portion of interest of the junction band comprises at least two of a point, a line, a single region or multiple regions, a user's operation for switching a type of the portion of interest may be received, and in response to the user's operation, the peristalsis information corresponding to the type of the portion of interest to which the user has switched may be displayed in a graphical manner.

In some embodiments, the peristalsis information may be displayed in association with the peristalsis information in a graphical manner about the portion of interest of the junction band.

In some embodiments, at least one of the first ultrasonic image, the target region including the portion of interest of the junction band (if any), and the portion of interest of the junction band may also be displayed. When displaying the first ultrasonic image or the target region, the portion of interest of the junction band may be highlighted on the first ultrasonic image or the target region.

In some embodiments, the peristalsis information may be displayed in association with the portion of interest of the junction band, such that the peristalsis information is changed as the change of the highlighted portion of interest of the junction band.

The disclosure may also provide a computer-readable storage medium on which computer-executable instructions are stored and, when executed by a processor, the measuring method for peristalsis information based on ultrasonic scanning is realized. The implementation of the measuring method for peristalsis information about the portion of interest of the junction band may be determined based on the first ultrasonic echo signal, the first ultrasonic image, the second ultrasonic echo signal and the second ultrasonic image mentioned above may apply here. The computer-readable storage medium may adopt read-only memory (ROM), flash memory, random access memory (RAM), dynamic random access memory (DRAM) such as synchronous DRAM (SDRAM) or Rambus DRAM, static memory (for example, flash memory, static random access memory), etc., on which computer executable instructions are stored in any format.

In addition, although illustrative embodiments are described herein, the scope includes any and all embodiments having equivalent elements, modifications, omissions, combinations (e.g., combinations of solutions of various embodiments), adjustments or changes based on this disclosure. The elements of the claim will be interpreted broadly based on the language used in the claim and not limited to the examples described in this specification or during the life of this application, which will be interpreted as non-exclusive. In addition, the steps of the exposed methods can be modified in any way, including by reordering steps or inserting or deleting steps. Thus, intent regards description only as an example, and the true scope is represented by the following claims and their full range of equivalents.

The above description is intended to be illustrative and not restrictive. For example, the above example (or one or more of its solutions) can be used in combination with each other. Those skilled in the art may use other embodiments when viewing the above description. Furthermore, in the detailed description above, various features can be grouped together to simplify this disclosure. This should not be interpreted as an intention to make a public feature that does not claim protection essential to any claim. Rather, the invention subject may lie in a combination of features that are fewer than all the features of a disclosed embodiment. Thus, the following claims are thus incorporated into the concrete embodiments as examples or embodiments, where each claim stands alone as a separate embodiments and, conceivably, these embodiments may be combined with each other in various combinations or permutations. The scope of the disclosure shall be determined by reference to the attached claims and the full extent of their equivalents.

What is claimed is:

1. A measuring method for peristalsis information based on ultrasonic scanning, comprising:
    obtaining a first ultrasonic echo signal by performing a first ultrasonic scan on a field of view comprising a junction band;
    obtaining a second ultrasonic echo signal by performing a second ultrasonic scan on a field of view comprising the junction band, the second ultrasonic scan being different from the first ultrasonic scan as a conventional scan mode;
    recognizing a portion of interest of the junction band and determining motion information about the portion of interest of the junction band according to the first or second ultrasonic echo signal or a first or second ultrasonic image generated therefrom; and
    determining peristalsis information about the portion of interest of the junction band according to the motion information about the portion of interest of the junction band;
    wherein
    the portion of interest of the junction band is recognized manually, semi-automatically or automatically, based on the ultrasonic echo signal or the ultrasonic image, by considering prior knowledge of anatomy of the junction band and an endometrium and/or a myometrium, through any one of the following ways:
    marking the endometrium manually, semi-automatically or automatically and taking an outer edge of the marked endometrium expanding automatically outward a predetermined thickness as the portion of interest of the junction band;
    marking the myometrium manually, semi-automatically or automatically and taking an inner edge of the marked myometrium expanding automatically inward a predetermined thickness as the portion of interest of the junction band; and
    marking the endometrium and the myometrium manually, semi-automatically or automatically and recognizing automatically an interlayer with a low grayscale value between the marked endometrium and myometrium as the portion of interest of the junction band.

2. The measuring method according to claim 1, wherein the recognized portion of interest of the junction band comprises a first portion of interest and a second portion of interest included in the first portion of interest;
    the measuring method specifically comprises:
    obtaining the first or second ultrasonic echo signal by performing the first or second ultrasonic scan on the first portion of interest;
    determining motion information about the first portion of interest of the junction band according to the first or second ultrasonic echo signal or the first or second ultrasonic image generated therefrom;
    extracting motion information about the second portion of interest of the junction band from the motion information about the first portion of interest of the junction band; and
    determining peristalsis information about the second portion of interest of the junction band according to the extracted motion information about the second portion of interest of the junction band.

3. The measuring method according to claim 1, wherein the portion of interest of the junction band is recognized through any one of the following ways:
    recognizing a point on the junction band and expanding the recognized point to obtain a line as the portion of interest of the junction band;
    recognizing a first line on the junction band and expanding the first line to obtain a second line with an increased length as the portion of interest of the junction band;
    recognizing a point or a line on the junction band and expanding the recognized point or line to obtain a single region or multiple regions as the portion of interest of the junction band; and
    directly recognizing a single region or multiple regions on the junction band as the portion of interest of the junction band.

4. The measuring method according to claim 3, wherein the portion of interest of the junction band is recognized through any one of the following ways:
    taking the recognized point and the obtained line as the portion of interest of the junction band, when the line as the portion of interest of the junction band is obtained by expanding the recognized point in the junction band;
    taking the recognized point or line, together with the obtained single region or multiple regions, as the portion of interest of the junction band, when the single region or multiple regions as the portion of interest of the junction band is or are obtained by expanding the recognized point or line in the junction band; and
    taking a line generated by the recognized single region or multiple regions, together with the single region or multiple regions, as the portion of interest of the junction band, when the single region or multiple regions is or are recognized directly.

5. The measuring method according to claim 1, further comprising: displaying the peristalsis information about the portion of interest of the junction band at least in a graphical manner.

6. The measuring method according to claim 5, wherein the portion of interest of the junction band comprises at least one of a point, a line, a single region and multiple regions; and said displaying the peristalsis information about the portion of interest of the junction band at least in a graphical manner comprises:

presenting the peristalsis information about the portion of interest of the junction band in a two-dimensional space-time diagram, when the portion of interest of the junction band is a line, wherein a number, a transmitting direction and a propagation velocity of peristaltic waves are capable of being determined from the two-dimensional space-time diagram;

presenting the peristalsis information about the portion of interest of the junction band in a displacement curve in time domain, when the portion of interest of the junction band is a point, wherein an intensity, a frequency and a significant movement time of peristaltic waves are capable of being determined from the displacement curve in the time domain; and presenting the peristalsis information about the portion of interest of the junction band in color coding or a three-dimensional space-time diagram, when the portion of interest of the junction band is a single region or multiple regions.

7. The measuring method according to claim 6, further comprising: displaying, in a comparative or switchable way, the peristalsis information in a graphical manner respectively corresponding to at least two geometric structures of the portion of interest, when the recognized portion of interest of the junction band comprises at least two of a point, a line, a single region or multiple regions.

8. The measuring method according to claim 7, further comprising: receiving from a user an operation for switching a type of the portion of interest, and, in response to the operation, displaying in a graphical manner the peristalsis information corresponding to the portion of interest of the type switched by the user, when the recognized portion of interest of the junction band comprises at least two of a point, a line, a single region or multiple regions.

9. The measuring method according to claim 5, further comprising: displaying in a graphical manner peristalsis parameters in association with the peristalsis information about the portion of interest of the junction band.

10. The measuring method according to claim 5, further comprising: displaying a first ultrasonic image or the second ultrasonic image, and highlighting the portion of interest of the junction band on the first ultrasonic image or the second ultrasonic image.

11. The measuring method according to claim 1, wherein the second ultrasonic scan and the first ultrasonic scan adopt different transmitting and receiving sequences, such that the second ultrasonic scan has a higher detection frame rate and/or is closer to a detection direction of the junction band than the first ultrasonic scan.

12. The measuring method according to claim 11, wherein the first ultrasonic scan and the second ultrasonic scan are performed alternately.

13. The measuring method according to claim 1, wherein determining motion information comprising
speckle tracking to obtain motion information of the portion of interest of the junction band; or
analyzing Doppler information about the ultrasonic echo signals to obtain motion information of the junction band.

14. The measuring method according to claim 13, wherein the speckle tracking comprises recognizing an intensity value of a pixel at a first position of an ultrasound image at a first time, searing at a surrounding position of the ultrasound image at a second time to find a second position with the maximum correlation, and obtaining a difference between the first and second positions at the first and second times.

15. The measuring method according to claim 13, wherein the motion information of the junction band by analyzing the Doppler information about the ultrasonic echo signals comprises a velocity of tissue at one or more potions of the junction band, and other information including displacement or acceleration and strain.

16. The measuring method according to claim 1, wherein the peristalsis information comprises:
an intuitive parameters of the junction band, including a number, intensity, spectral parameters, significant movement area with intensity exceeding a threshold, transmission direction, or propagation speed; and
a peristaltic process of the junction band, including real-time movement amplitude, or movement direction.

17. A measuring method for peristalsis information based on ultrasonic scanning, comprising:
obtaining a ultrasonic echo signal by performing a ultrasonic scan on a field of view comprising a junction band;
recognizing a portion of interest of the junction band based on the ultrasonic echo signal or a first ultrasonic image generated therefrom; and
determining peristalsis information about the portion of interest of the junction band based on the ultrasonic echo signal or the first ultrasonic image generated therefrom;
wherein
the portion of interest of the junction band is recognized manually, semi-automatically or automatically, based on a second ultrasonic image, by considering prior knowledge of anatomy of the junction band and an endometrium and/or a myometrium, through any one of the following ways:
marking the endometrium manually, semi-automatically or automatically and taking an outer edge of the marked endometrium expanding automatically outward a predetermined thickness as the portion of interest of the junction band;
marking the myometrium manually, semi-automatically or automatically and taking an inner edge of the marked myometrium expanding automatically inward a predetermined thickness as the portion of interest of the junction band; and
marking the endometrium and the myometrium manually, semi-automatically or automatically and recognizing automatically an interlayer with a low grayscale value between the marked endometrium and myometrium as the portion of interest of the junction band.

18. The measuring method according to claim 17, wherein said determining peristalsis information about the portion of interest of the junction band based on the ultrasonic echo signal or the first ultrasonic image comprises any one of the following:
determining motion information about the field of view based on the ultrasonic echo signal or the first ultrasonic image, extracting motion information about the portion of interest of the junction band from the motion information about the field of view, and determining the peristalsis information about the portion of interest of the junction band according to the motion information about the portion of interest of the junction band; or
determining motion information about a target region including the portion of interest of the junction band based on the ultrasonic echo signal or the first ultrasonic image, extracting motion information about the portion of interest of the junction band from the motion information about the target region, and determining the peristalsis information about the portion of interest of the junction band according to the motion information about the portion of interest of the junction band; or determining motion information about a target region based on the ultrasonic echo signal or the first ultrasonic image, determining peristalsis information about the target region according to the motion information about the target region, and extracting the peristalsis information about the portion of interest of the junction band from the peristalsis information about the target region; or determining motion information about the portion of interest of the junction band based on the ultrasonic echo signal or the first ultrasonic image, and determining the peristalsis information about the portion of interest of the junction band according to the motion information about the portion of interest of the junction band.

19. The measuring method according to claim 18, wherein the target region further comprises at least part of at least one of a myometrium and an endometrium, besides the portion of interest of the junction band.

20. A measuring apparatus for peristalsis information based on ultrasonic scanning, comprising:

an ultrasonic probe configured to transmit ultrasonic waves to a field of view comprising a junction band and receive corresponding ultrasonic echoes to obtain an ultrasonic echo signal;

a transmitting and receiving-controlling circuit configured to output a transmitting and receiving sequence to the ultrasonic probe to control the ultrasonic probe to transmit the ultrasonic waves and receive the ultrasonic echoes; and at least one processor configured to:

control transmission and reception of the ultrasonic probe by the transmitting and receiving-controlling circuit to perform a first ultrasonic scan on the field of view comprising a junction band to obtain a first ultrasonic echo signal, or to perform a second ultrasonic scan on a portion of interest of the junction band to obtain a second ultrasonic echo signal;

recognize a portion of interest of the junction band;

determine motion information about the portion of interest of the junction band according to the first or second ultrasonic echo signal or a first or second ultrasonic image generated therefrom; and determine peristalsis information about the portion of interest of the junction band according to the motion information about the portion of interest of the junction band.

* * * * *